(No Model.)

J. MILLER.
REFRIGERATOR.

No. 264,185. Patented Sept. 12, 1882.

Witnesses,
Geo. H. Strong
L. H. Strouse

Inventor,
James Miller
By Dewey & Co.
Attorneys

UNITED STATES PATENT OFFICE.

JAMES MILLER, OF OAKLAND, CALIFORNIA.

REFRIGERATOR.

SPECIFICATION forming part of Letters Patent No. 264,185, dated September 12, 1882.

Application filed May 27, 1882. (No model.)

*To all whom it may concern:*

Be it known that I, JAMES MILLER, of Oakland, county of Alameda, State of California, have invented an Improved Refrigerator; and I hereby declare the following to be a full, clear, and exact description thereof.

My invention relates to the class of refrigerators; and it consists generally in the construction and arrangement of peculiar vessels, providing for the holding of the substance to be kept cool, and a surrounding and underlying water-space.

It consists particularly in a deep vessel with vertical sides, and provided with a centrally-perforated false bottom, upon which a holding-vessel of smaller diameter and extending above the exterior vessel is placed, whereby a surrounding and underlying water-space is formed.

It further consists in the provision of an air-tight cover for the holding-vessel, all of which will hereinafter fully appear.

The object of my invention is to provide a simple, economical, and effective refrigerating device for containing any substance or article which should be kept cool.

Figure 1:
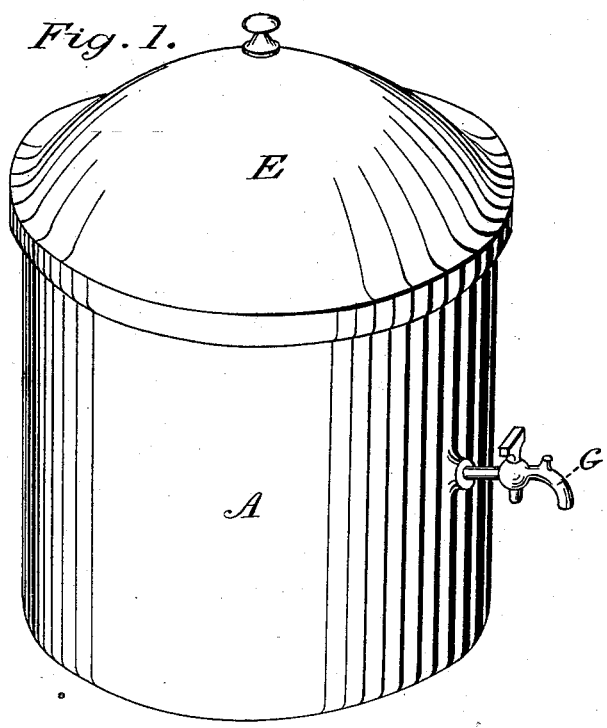
Figure 2:
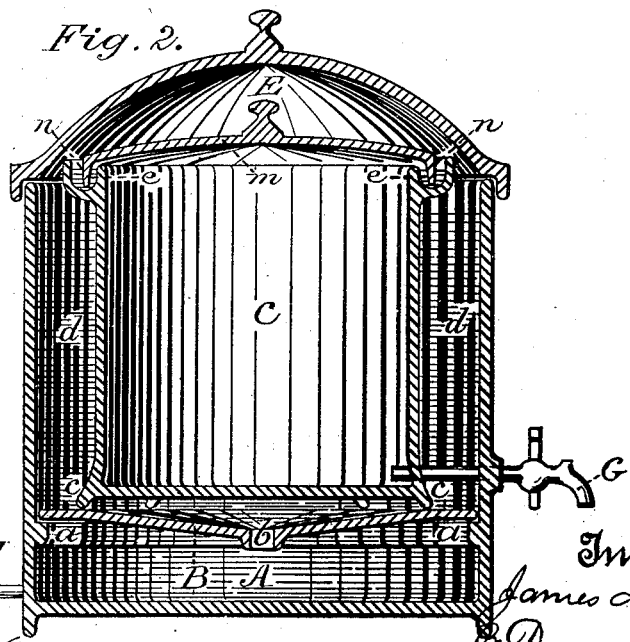

Referring to the accompanying drawings, Figure 1 is a perspective. Fig. 2 is a section.

Let A represent a deep vessel having vertical sides. Upon its inner surface, at a suitable distance from the bottom, is formed a ledge, $a$, around its circumference. Upon this is placed and supported a disk, B, forming for said vessel a false bottom. This disk is made concave to its center, where it is provided with an aperture, $b$. Between the false bottom B and the bottom of vessel A is thus formed a space designed to contain water, an escape for which is furnished by a stop-cock, J.

C is a vessel provided with short legs $c$. It extends higher than the top of vessel A. It is smaller in diameter than said vessel, by reason of which and being set on legs a circumscribing and underlying space, $d$, is formed between it and vessel A.

E represents a concave top or lid fitting the vessel A.

The entire device is to be made preferably of terra-cotta unglazed, though I do not confine myself to this material, as other substances would answer, though not as well.

The advantage of the false bottom is that it allows me to have a large underlying water-space, and still provide the holding-vessel with short legs.

In earthenware long legs would be a decided disadvantage on account of their liability to be broken.

The concave face of the false bottom directs the water to its central perforation, and allows it to be drawn off with facility.

To use the refrigerator I place the substance to be kept cool—say, for example, butter—in the holding-dish C, which may be provided with suitable shelves to receive it. I remove cap E and pour water into the water-space $d$. It flows downward under the holder C and fills the water-space under the false bottom B, and finally fills up all the underlying and circumscribing space $d$ to the top. The holding-vessel being higher than vessel A, the water cannot flow over into it. The top or cover is then replaced. When desired the water may be drawn off through the stop-cock and fresh water poured in.

This device may be used for containing and keeping cool liquids—such as cider—and in case the holding-vessel has to be air-tight a surrounding cup or trough, $e$, is formed around the outer side of its top. This is filled with water, and a cover or lid, $m$, with a downwardly-turned flange, $n$, is laid upon top of vessel C, and is so supported that its flange $n$ extends down into the water in trough $e$, thus forming a water seal against the air.

For holding liquids the vessel C should be glazed inside, and a stop-cock or faucet, G, provided, leading from said vessel through exterior vessel, A.

I am aware that cooling-vessels have heretofore been made having the general characteristics of my invention, and hence I make no broad claim to any portion of it, but confine myself strictly to my construction and arrangement as claimed.

Having thus described my invention, what I claim as new, and desire to secure by Letters Patent, is—

A refrigerator consisting of the vessel A, with its ledge $a$, the concaved centrally-perforated false bottom or disk B, fitting upon said ledge, whereby a water-space is formed between it and the bottom of vessel A, the holding-vessel C, of smaller diameter than A, having legs $c$ resting upon said false bottom, and trough $e$ around its top, lid $m$, with its lip $n$, and outer cover, E, all constructed, arranged, and operated as set forth.

In witness whereof I hereunto set my hand.

JAMES MILLER.

Witnesses:
C. D. COLE,
J. H. BLOOD.